(No Model.) 2 Sheets—Sheet 1.
J. R. THOMAS.
PLANING MACHINE.
No. 448,384. Patented Mar. 17, 1891.
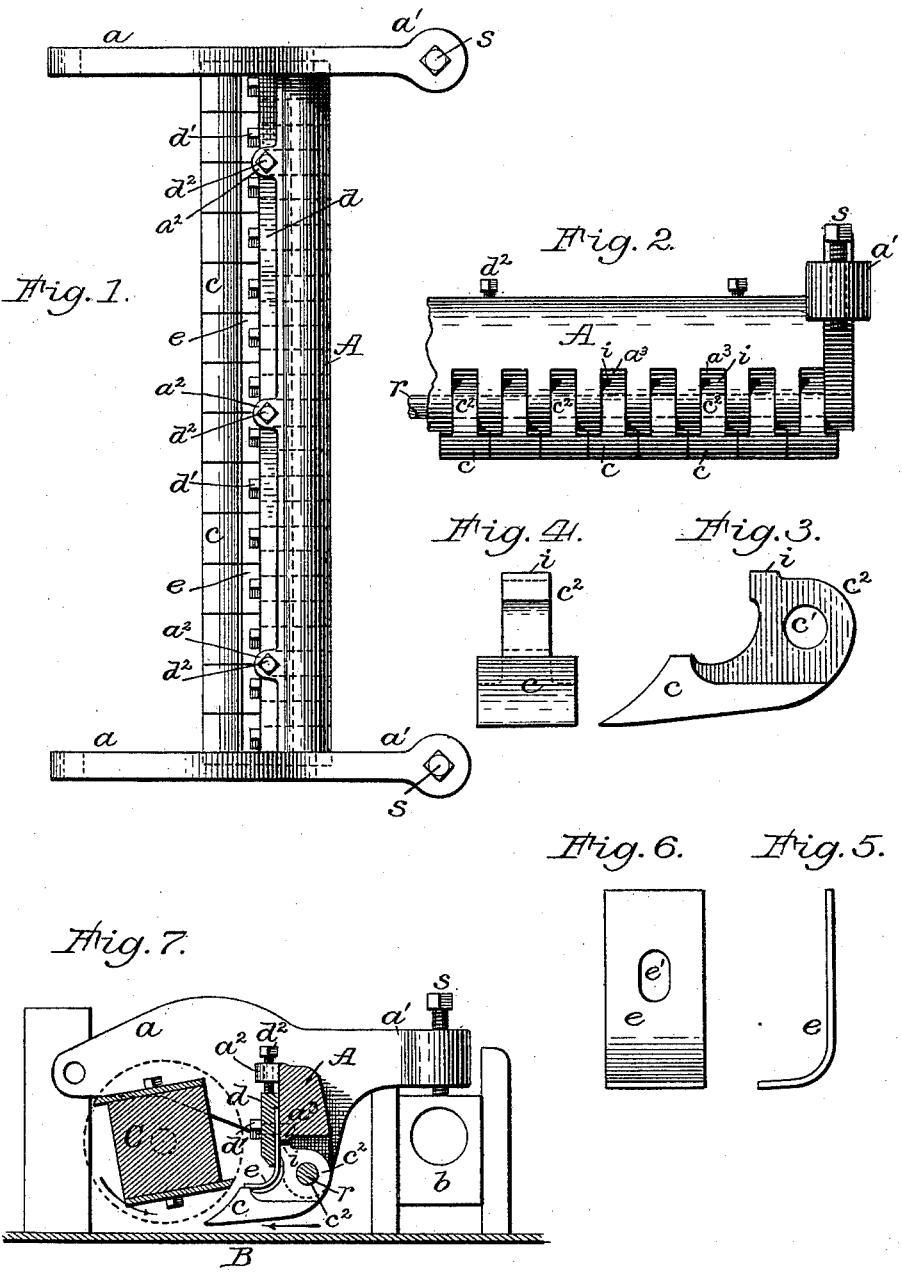

(No Model.) 2 Sheets—Sheet 2.

J. R. THOMAS.
PLANING MACHINE.

No. 448,384. Patented Mar. 17, 1891.

Attest:
Howell Bartle
Alex Scott

Inventor:
John R. Thomas
By Philip F. Larner.
Associate Attorney

UNITED STATES PATENT OFFICE.

JOHN R. THOMAS, OF BOSTON, MASSACHUSETTS, ASSIGNOR TO THE S. A. WOOD MACHINE COMPANY, OF SAME PLACE.

PLANING-MACHINE.

SPECIFICATION forming part of Letters Patent No. 448,384, dated March 17, 1891.

Application filed January 15, 1890. Serial No. 337,028. (No model.)

*To all whom it may concern:*

Be it known that I, JOHN R. THOMAS, of Boston, in the county of Suffolk and State of Massachusetts, have invented certain new and useful Improvements in Planing-Machines, of which the following is a specification.

My invention relates to planing-machines; and it consists in certain constructions and combinations of the several parts of the pressure-bar and the mounting thereof in such machines, substantially as hereinafter described and claimed.

Figure 8:
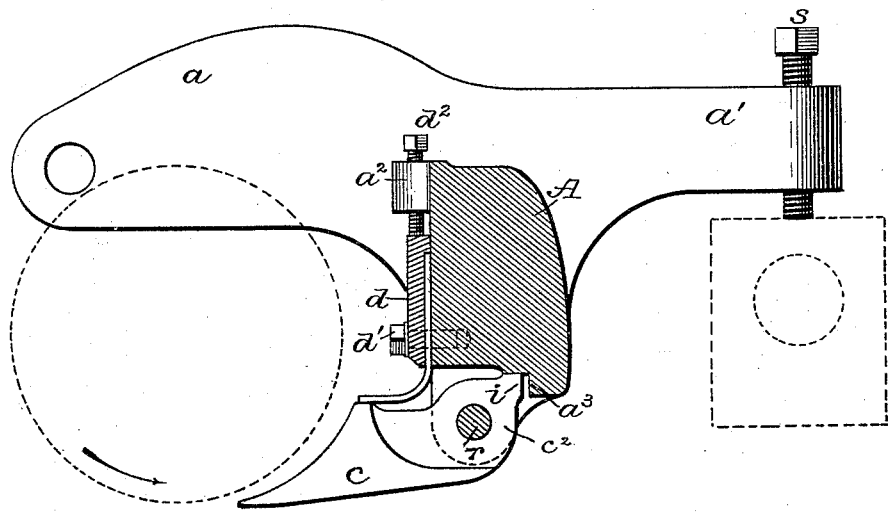
Figure 9:
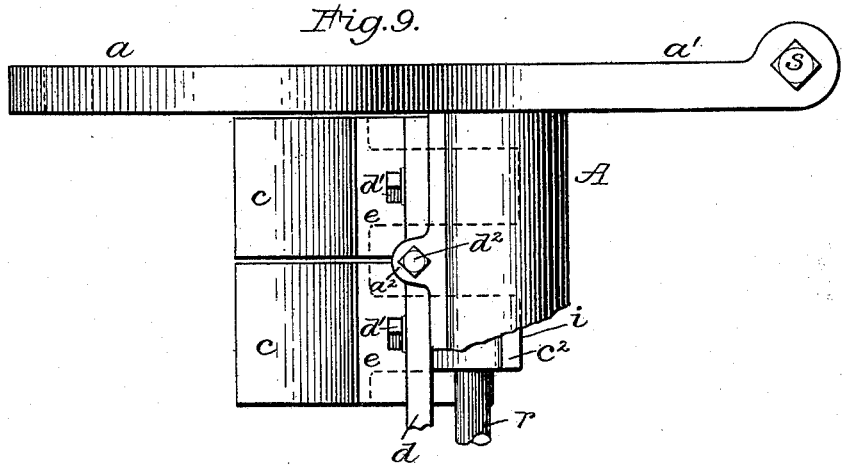

In the drawings, Figure 1 is a top plan view of a pressure-bar constructed according to my invention. Fig. 2 is an elevation of a portion of the same on the feed-in side of the bar. Figs. 3, 4, 5, and 6 are respectively side and end elevations of one of the pivoted feet and its compressing-spring of the bar enlarged. Fig. 7 is a longitudinal vertical section of a portion of a planing-machine with my bar mounted therein. Figs. 8 and 9 are representations of a modified form of mounting the springs and pivoted feet.

A is the pressure-bar, provided with curved arms $a\ a$, which are constructed to extend around the axis of the planing-cylinder and be pivoted to the frame of the machine on the opposite side from where the feet of the pressure-bar bear upon the lumber. In the opposite direction from these arms other arms $a'\ a'$ extend from the bar and have set-screws $s\ s$ extending through their ends, which rest upon the boxes of the roller on the feed-in side of the cylinder, one of which boxes $b$ is shown in Fig. 7. The function of these set-screws is to raise the pressure-bar by means of the roller-boxes when a piece of lumber too thick to enter under the bevel of the lead-in side of the bar is fed into the machine, but for all less thicknesses they are not intended to rest on the boxes $b$.

The pressure-bar A is provided with a series of pivoted feet $c\ c$, which are provided with tongues $c^2$ on their rear upper parts, which enter corresponding slots in the lower side of the bar A. These pivoted feet are shown as mounted in the bar A so as to fit closely together on their sides and form a substantially-continuous yielding pressure-edge projecting forward from bar A underneath the path of the cutting-cylinder of the planing-machine; but they may be separated sufficiently to clear themselves of chips or shavings falling between them, if desired. The number of them attached to bar A may be varied from one to many, as it is desired to have them yield and fit less or more intimately to the transverse irregularities of the lumber being dressed. The pivoted feet $c$ are attached to the bar A by a rod $r$, passing through their pivot-holes $c'$ and through the divisions between the slots in the bar which receive their tongues. In order to give them an elastic pressure on the lumber and provide for their yielding properly to the inequalities of it, I provide each foot with a pressure-spring $e$, which is attached adjustably to the bar by the cap $d$ and screw $d'$, which passes through the elongated slot $e'$ in the spring and clamps the cap firmly to the bar.

As it is often necessary to give a nice adjustment to each of the springs $e$ for the purposes hereinafter described, I further provide for doing this readily by having the upper inner face of cap $d$ provided with a lip, which laps over the upper end of spring $e$, as shown in Figs. 7 and 8, and provide the set-screw $d^2$, passing through the ear $a^2$ on bar A and bearing upon the upper end of the cap $d$. The cap $d$ may be employed to adjust and hold in place one or more than one spring, as may be most convenient. The function of the spring $e$ with each of the pivoted feet $c$ is not only to give the foot an elastic bearing upon the lumber, but it has also a more important function—viz., to lift the pressure-bar with greater ease than would be possible without it.

It is well understood that is order to do smooth and finished work with a planing-machine having its rotary cylinder C revolving against the motion of the advancing board, as indicated by the arrows in Fig. 7, it is necessary to have the pressure-bar on the feed-in side of the cylinder first bear as closely as possible to the path of its knives, and, secondly, yield readily to the inequalities of the undressed surface of the board, and, thirdly, substantially preserve its contiguity to the cut with different thicknesses of the board passing under it. The method of accomplishing this result heretofore, adopted on account of its apparent simplicity, was to provide the bar with one or more pressure-feet and mount the bar or its feet on arms pivoted around the cylinder-shaft or in grooves in the housing or bar concentric with the cylinder, or nearly so. This method, however, gave rise to another difficulty—i. e., that when a light cut or even an ordinary one was taken by the cylinder and the concentrically-moving pressing edge of the bar was brought near the cut that edge had to be carried so far under the cylinder that the friction of the advancing board tended to carry it forward with the latter more than it did to lift it in its concentric grooves or on its concentrically-pivoted arms. With this construction it was not until the bar was lifted so high above the line of cut of the cylinder that it was above a line passing under it through the center of the cylinder at an angle of forty-five degrees to the line of cut (or bed of the machine) that the bar began to be lifted upward more readily than it was carried forward by the moving board; but it is obviously impracticable to have the cylinder take a cut so deep as this on fine work as a rule, on account of the waste of expensive lumber, if for no other reason. Hence other planing-machine constructors sought to get rid of this new difficulty by extending the arms of the pressure-bar over to the opposite side of the cylinder-shaft and there pivoting them to the frame of the machine, substantially as shown in Fig. 7. It was then found that if this pivot was located so as to fall on or near a line drawn from the bearing-point of the pressure-bar through the axis of the cylinder, as shown in Fig. 7, the bar still rose and fell substantially concentric with the path of the knives; but it still also lifted so hard on account of its cam action with the moving board that it took too much power to drive the planing-machine. The arms $a$ $a$ of the bar were therefore pivoted above or below this line far enough to avoid this difficulty, which varied the motion of the bearing-edge of the bar sensibly from concentricity with the path of the cylinder-knives and so affected the perfection of the planing of the lumber. Thus it will be seen that constructors of planing-machines, in endeavoring to get the pressure-bar to bear close to the path of the cylinder and rise and fall concentrically with the latter to preserve that position with varying lumber, have, on account of this cam action of the bar, traveled in a circle and always with a solid bar or one having solid feet been obliged to come back to the point of allowing the bar to bear at varying distances from the cut of the cylinder to enable it to automatically rise and fall with approximate ease of action. By my present invention I avoid this difficulty and make the bar rise easily and surely with its bearing-edge substantially concentric with the path of the cylinder within the limits of the ordinary cut of a planing-machine in dressing lumber. When the board passes under one of the pivoted feet $c$ and raises its bearing-point, it turns on its pivot in the bar A and compresses the spring $e$, thereby storing up the lifting-power it exerts in the spring as the latter is compressed or put under tension. When the stored-up power in the spring is sufficient to overcome the inertia of the bar A, it lifts the bar with comparative ease on its bearing-pivots, because the part of the spring bearing upon the bar is located back, where it is outside the overhang of the cylinder, and the power it exerts is not neutralized by the forward movement of the board. In other words, the lift of the spring is the same in kind upon the bar A as the lift of a foot would be which bore upon the board directly below their point of contact and at a distance from the cylinder and lifted directly upward. The lifting-power of the foot $c$ in rising is thus transferred to the heel of spring $e$, where it can act with the best effect upon the bar A, and the initial yielding of the foot itself on its pivot, not being in the arc of a circle backward and upward concentric with the cylinder, is not resisted by the advancing movement of the board, as it would be if the foot were in one piece with bar A or itself mounted in similarly-acting guideways. This action of the pivoted foot $c$ and spring $e$ in lifting bar A would be the same with a single foot or a number of them pivoted to the bar; but the use of a number of them allows their bearing-surfaces to fay down into irregularities in the board and prevent any part of it from springing or chattering under the action of the cutting-cylinder. A certain amount of time is necessary to allow the lifting action of the board to be transferred from the toe of foot $c$ to the heel of its spring $e$, and it is possible to lift the toe so suddenly as to bring it in contact with the cutters of the cylinder before its spring can act. To avoid this contingency from knots or slivers, &c., disengaged by the cutters coming into contact with the foot $c$, I provide it with a shoulder or projection $i$, which comes in contact with the corresponding shoulder $a^3$ on bar A in time to arrest the foot after it has compressed its spring and before its toe has reached the cutters. This shoulder is shown in a different position in Figs. 8 and 9; but it operates in substantially the same manner.

It is evident that the spring $e$ may be attached to the foot $c$ and made to bear against the bar A in various positions, so as to produce the same practical effect, and that its shape may be changed accordingly without departing from the spirit of my invention. It is also evident that at whatever curve the bar A travels around the cutter-head to take its bearing upon the lumber the arrangement of the foot $c$ and its spring $e$ will enable it to rise easier against the forward motion of the incoming board than if the bar were of the ordinary construction; also, that if the bar were mounted in curved grooves instead of upon pivoted arms these parts would act in substantially the same manner in lifting the bar.

What I claim as new and of my invention is—

1. The combination of the pressure-bar A, mounted on guiding-supports which direct it in a curved path around the cylinder, one or more feet $c$, pivoted therein and descending and taking their bearing upon the lumber in such curved path approximating to the direction in which the latter advances, and one or more springs $e$, arranged to transfer the lifting action of the bearing-toe of the foot to the bar, substantially as described.

2. The combination of the feed-in pressure-bar A, mounted on guiding-supports which direct it in a curved path around the cylinder, provided with one or more shoulders $a^3$, one or more feet $c$, pivoted in the bar, provided with the shoulder $i$ and descending and taking their bearing upon the lumber in such curved path approximating to the direction in which the latter advances, and one or more springs $e$, arranged to transfer the lifting action of the bearing-toe of the foot to the bar, substantially as described.

3. The combination of the feed-in pressure-bar A, mounted on guiding-supports which direct it in a curved path around the cylinder, and two or more feet $c\ c$, pivoted therein, descending and taking their bearing upon the lumber underneath the cylinder in a curved path approximating to the direction in which the latter advances, each provided with a bearing-spring arranged to transfer the lifting action of the bearing-toe of the foot to the bar, substantially as described.

4. The combination of the feed-in bar A, having one or more slots or mortises in its lower side, one or more feet $c$, pivoted in said slots, and one or more springs $e$, bearing upon the bar and foot between its axis and its bearing-toe, substantially as described.

5. The combination of the bar A, one or more feet $c$, pivoted to the lower side thereof, one or more springs $e$, attached to said bar, and the cap $d$ and adjusting-screw $d^2$, arranged to adjust the tension of said spring upon the foot, substantially as described.

6. The combination of the bar A, one or more feet $c$, pivoted in the lower side thereof, one or more springs $e$, bearing upon the foot between its toe and pivot, and the shoulders $a^3$ and $i$, located on the bar and foot and arranged to prevent the latter rising into the cutters, substantially as described.

JOHN R. THOMAS.

Witnesses:
N. P. OCKINGTON,
DAVID HALL RICE.